US010336279B2

(12) United States Patent
Farooq et al.

(10) Patent No.: US 10,336,279 B2
(45) Date of Patent: Jul. 2, 2019

(54) BULKHEAD MOUNTED AIRBAG FOR FRONT SEATS

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 34 days.

(21) Appl. No.: 15/608,063

(22) Filed: May 30, 2017

(65) Prior Publication Data

US 2018/0345895 A1 Dec. 6, 2018

(51) Int. Cl.
*B60R 21/16* (2006.01)
*B60R 21/205* (2011.01)
(Continued)

(52) U.S. Cl.
CPC .......... *B60R 21/205* (2013.01); *B60R 21/231* (2013.01); *B60R 21/237* (2013.01);
(Continued)

(58) Field of Classification Search
CPC ............... B60R 21/205; B60R 21/231; B60R 21/23138; B60R 2021/23107;
(Continued)

(56) References Cited

U.S. PATENT DOCUMENTS 3,752,501 A * 8/1973 Daniel ................. B60R 21/233
280/729
3,801,126 A 4/1974 Knight, IV et al.
(Continued)

FOREIGN PATENT DOCUMENTS

DE 202013002020 U1 5/2013
EP 1531097 A 5/2005
(Continued)

OTHER PUBLICATIONS

Search Report from United Kingdom Intellectual Property Office dated Nov. 7, 2018 regarding Application No. GB1808733.8 (4 pages).

*Primary Examiner* — Toan C To
(74) *Attorney, Agent, or Firm* — Frank A. MacKenzie; Bejin Bieneman PLC

(57) ABSTRACT

A vehicle includes a bulkhead and an airbag inflatable to an inflated position. The airbag includes a forward-facing panel mounted to the bulkhead and a rearward-facing panel opposite the forward-facing panel. Then airbag in the inflated position has a left extension and a right extension extending from the rearward-facing panel, and an intermediate extension sandwiched between the left extension and the right extension. The intermediate extension extends from the rearward-facing panel farther than the left and right extensions. During a vehicle impact, the momentum of the occupant may move the occupant towards the airbag. The airbag may absorb energy from the head and knees of the occupant.

20 Claims, 8 Drawing Sheets

(51) Int. Cl.
*B60R 21/231* (2011.01)
*B60R 21/237* (2006.01)

(52) U.S. Cl.
CPC ............... *B60R 2021/23107* (2013.01); *B60R 2021/23161* (2013.01); *B60R 2021/23169* (2013.01)

(58) Field of Classification Search
CPC .. B60R 2021/23576; B60R 2021/0009; B60R 2021/23161
USPC ........................................................ 280/729
See application file for complete search history.

(56) References Cited

U.S. PATENT DOCUMENTS

| | | | |
|---|---|---|---|
| 5,470,103 A | 11/1995 | Vaillancourt et al. | |
| 5,480,184 A * | 1/1996 | Young | B60R 21/05 280/728.3 |
| 5,529,337 A * | 6/1996 | Takeda | B60R 21/233 280/729 |
| 5,577,765 A * | 11/1996 | Takeda | B60R 21/233 280/729 |
| 6,073,960 A * | 6/2000 | Viano | B60R 21/231 280/730.1 |
| 6,217,059 B1* | 4/2001 | Brown | B60R 21/16 280/730.1 |
| 6,817,626 B2 | 11/2004 | Boll et al. | |
| 9,227,587 B1 | 1/2016 | Belwafa et al. | |
| 9,446,735 B1 | 9/2016 | Jayasuriya et al. | |
| 9,566,929 B1* | 2/2017 | Belwafa | B60R 21/205 |
| 9,731,677 B1* | 8/2017 | Belwafa | B60R 21/233 |
| 2011/0266780 A1* | 11/2011 | Komoll | B60R 21/231 280/730.2 |
| 2016/0297393 A1 | 10/2016 | Fukawatase et al. | |
| 2017/0057453 A1 | 3/2017 | Morris et al. | |

FOREIGN PATENT DOCUMENTS

| | | |
|---|---|---|
| JP | 20150120382 A | 7/2015 |
| JP | 2015157602 A | 9/2015 |
| KR | 19980048826 U | 10/1998 |

* cited by examiner

BULKHEAD MOUNTED AIRBAG FOR FRONT SEATS

BACKGROUND

During a vehicle impact, occupants may move in a direction influenced by the momentum of the vehicle. In a frontal vehicle impact, an occupant may contact a vehicle component, e.g., an instrument panel, in front of the occupant. During the impact, the vehicle decelerates before the occupant decelerates. When the vehicle has decelerated but the occupant still has forward momentum, the occupant leans forward and may slide forward. This motion may bring the head or knees of the occupant in contact with the vehicle component in front of the occupant.

Some vehicle impacts, e.g., front impact, side impact, frontal offset impacts, far side oblique impact, near side oblique impact, etc., may cause the occupants to move at an angle towards vehicle components or another occupant. In this situation, the momentum of the occupant may urge the head of the occupant to slide and/or rotate across a face of an inflated airbag.

DETAILED DESCRIPTION

A vehicle includes a bulkhead and an airbag inflatable to an inflated position. The airbag includes a forward-facing panel mounted to the bulkhead and a rearward-facing panel opposite the forward-facing panel. The airbag in the inflated position includes a left extension and a right extension extending from the rearward-facing panel, and an intermediate extension sandwiched between the left and right extensions. The intermediate extension extending from the rearward-facing panel farther than the left and right extensions.

The forward-facing panel may face the bulkhead.

The vehicle may include a base mounted to the bulkhead and supporting the airbag. The forward-facing panel may include a base mounted to the bulkhead. The forward-facing panel and the rearward facing panel may be inflatable upwardly and downwardly relative to the base.

The rearward-facing panel may include a first portion extending upwardly relative to the base to a first distal end spaced from the base. The left extension, the right extension, and the intermediate extension may each extend from the first portion. The first portion may include an opening extending into each of the left extension, the right extension and the intermediate extension. A plurality of tethers may extend across the opening.

The rearward-facing panel may include a second portion extending downwardly relative to the base to a second distal end. The first portion and the second portion may be rolled in opposite directions relative to the base in an uninflated position.

A deflector may be connected to the bulkhead adjacent the forward-facing panel. The deflector may extend transverse to the bulkhead.

The vehicle may include a roof and a floor spaced from the roof. The airbag in the inflated position may extend from the roof to the floor. The first portion may extend upwardly relative to the base along the roof to the first distal end. The left extension, the right extension, and the intermediate extension may each extend downwardly from the first portion towards the floor.

The vehicle may include front pillars spaced from each other in a cross-vehicle direction. The airbag may extend from the one front pillar to the other front pillar.

The vehicle may include front seats spaced from each other. The intermediate extension in the inflated position may be disposed between the one front seat and the other front seat.

The intermediate extension may be attached to both the left extension and the right extension.

Figure 1:
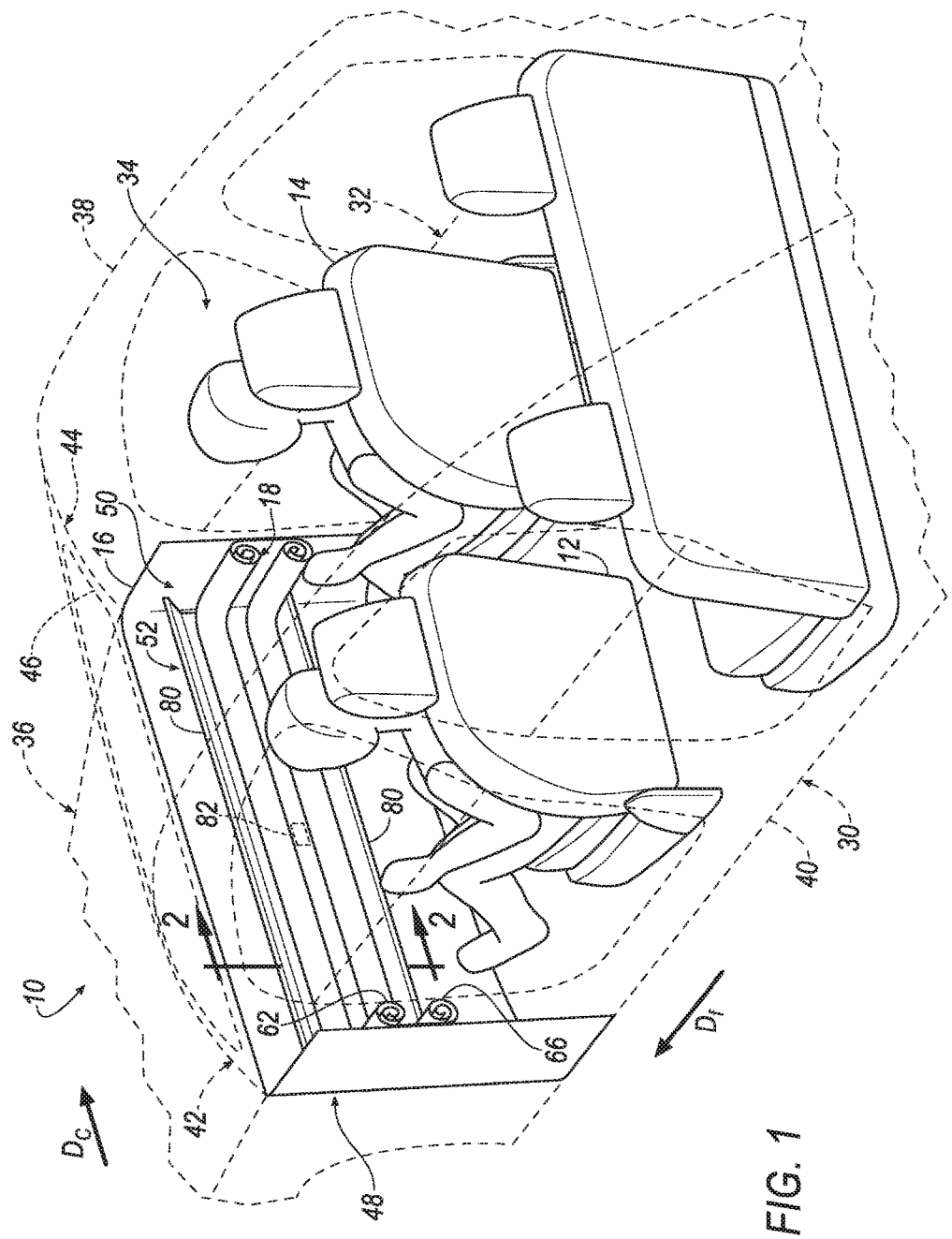
FIG. 1 is a perspective view of a vehicle with an airbag assembly in an uninflated position.
Figure 2:
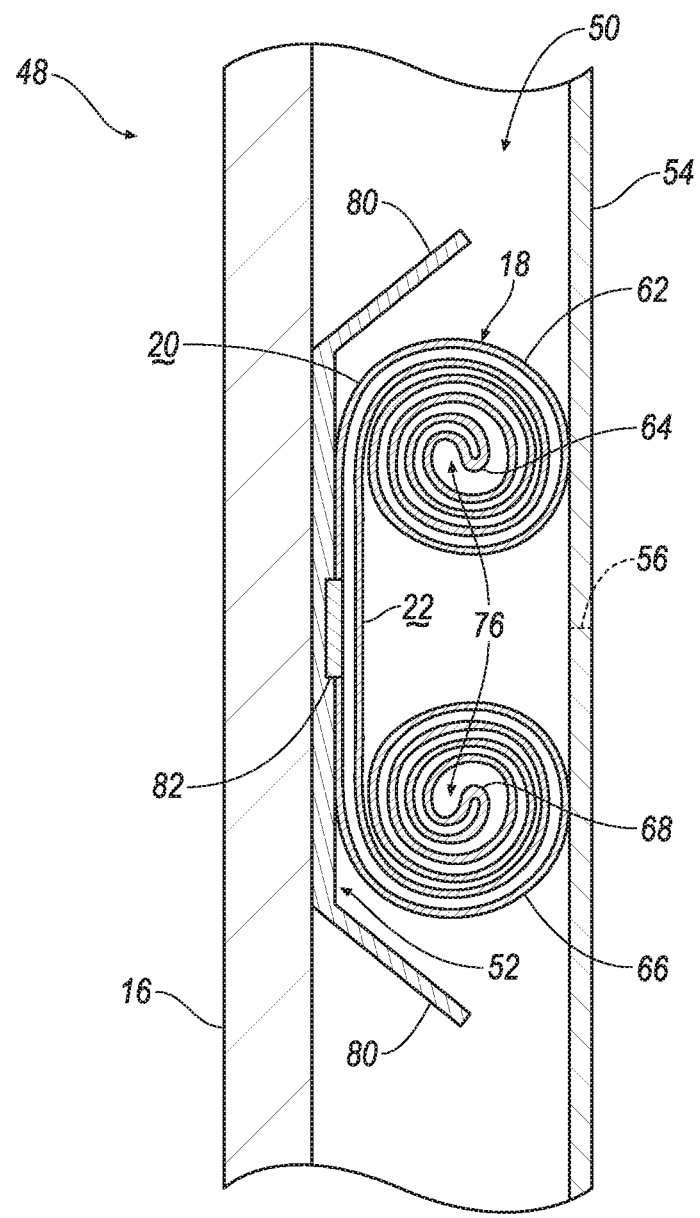
FIG. 2 is a cross sectional view along line 2 of the vehicle with the airbag assembly in the uninflated position and including a trim panel not shown in FIG. 1 for illustrative purposes.
Figure 3:
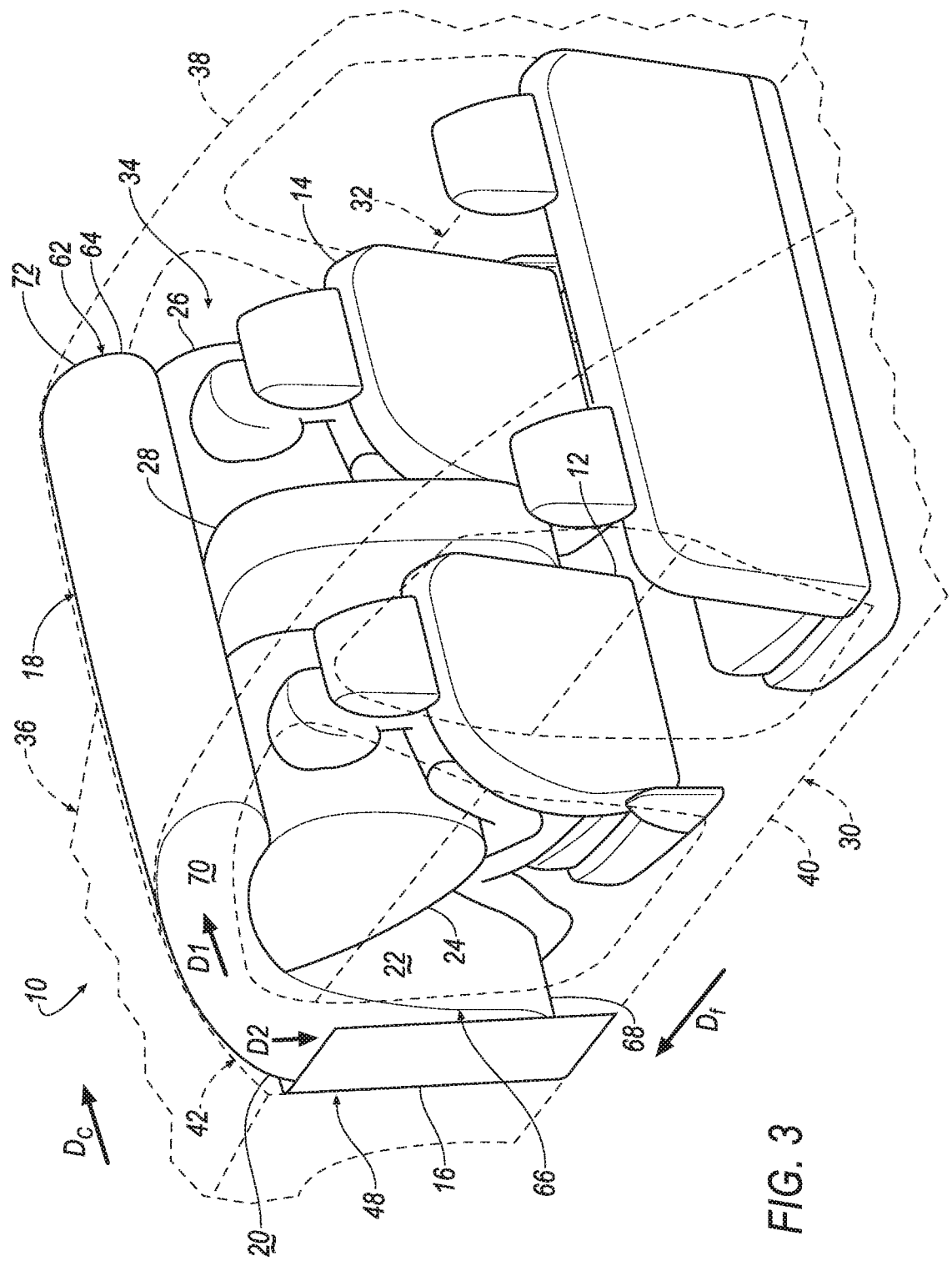
FIG. 3 is a perspective view of the vehicle with the airbag assembly in an inflated position.
Figure 4:
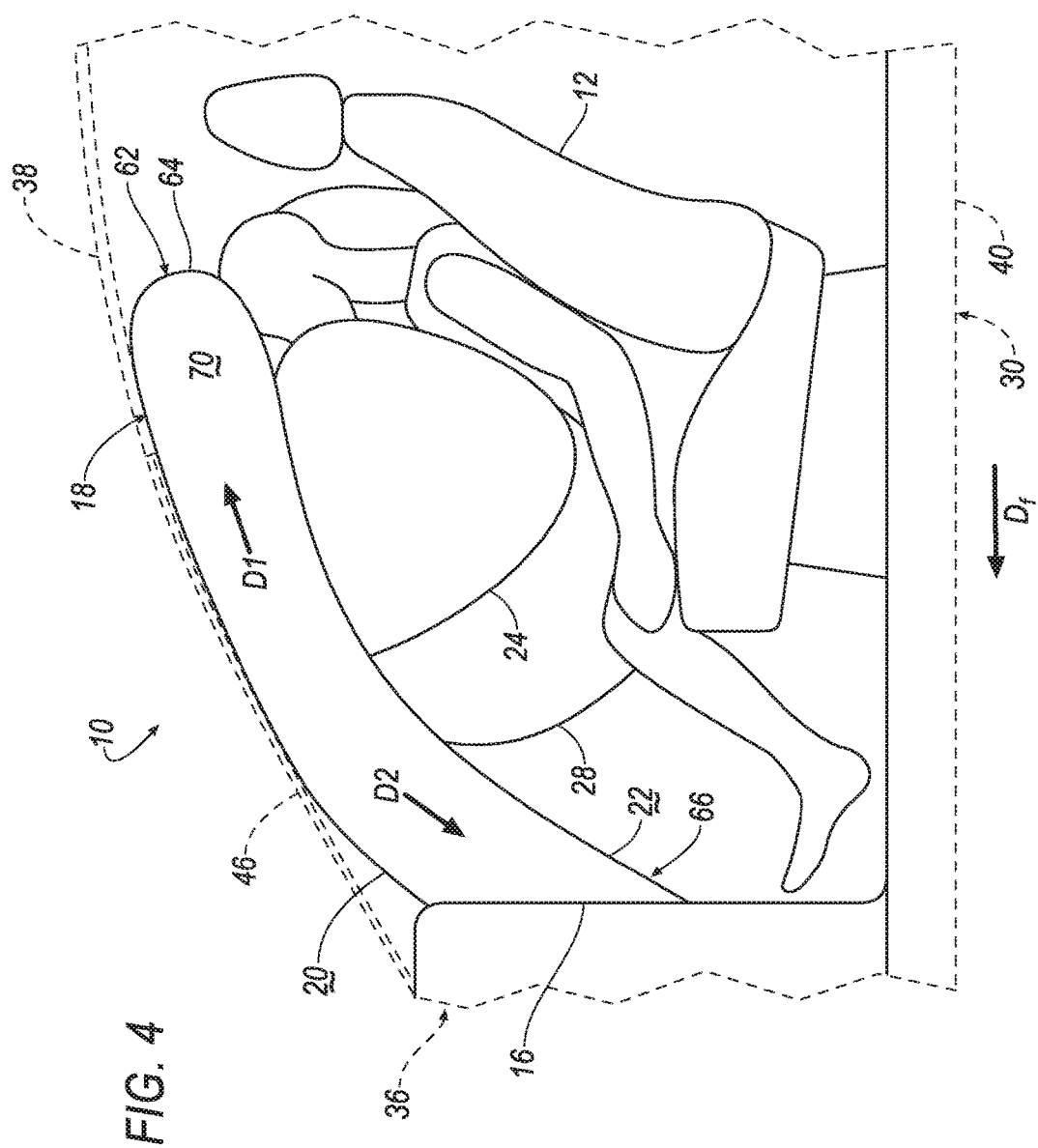
FIG. 4 is a side view of the vehicle with airbag assembly in the inflated position.
Figure 5A:
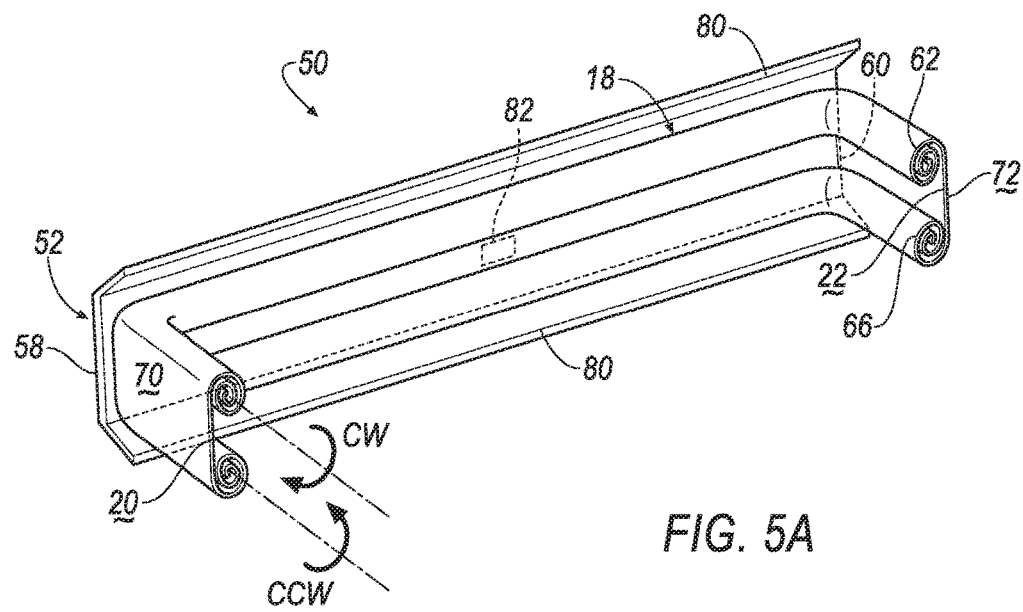
FIG. 5A is a perspective view of the airbag assembly in the uninflated position including a base and an airbag supported by the base.
Figure 5B:
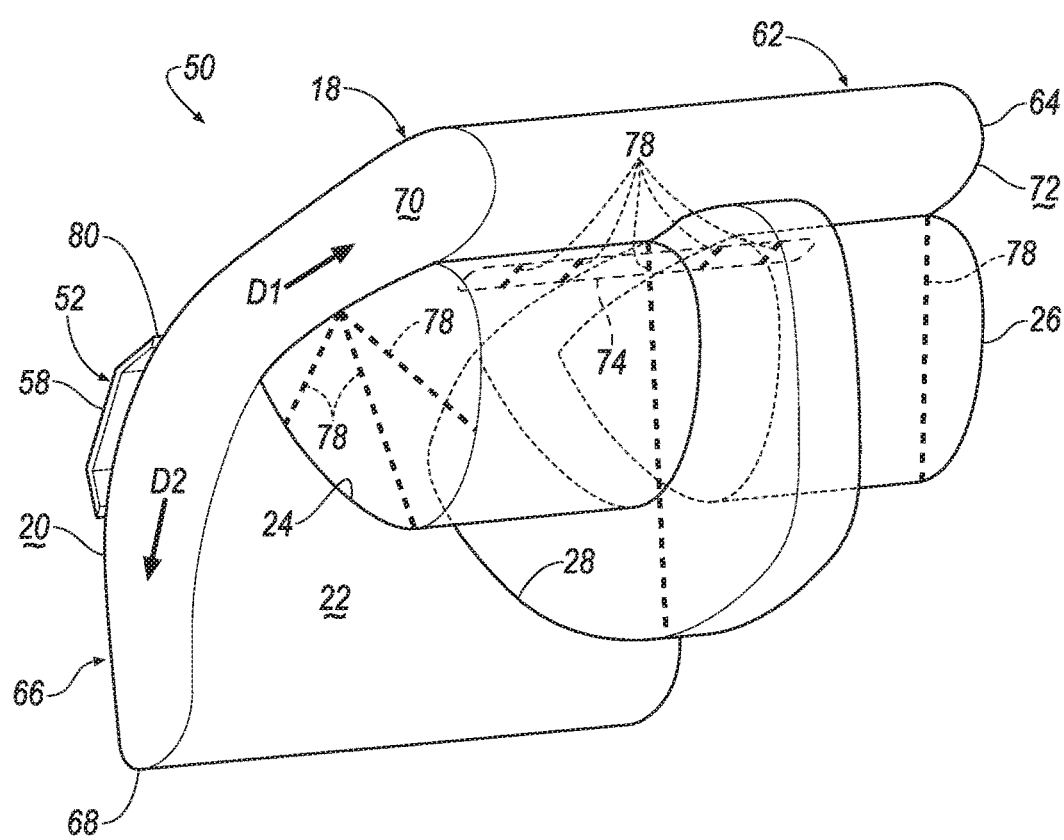
FIG. 5B is a perspective view of the airbag assembly in the inflated position including the base, the airbag supported by the base, and a left extension, a right extension, and an intermediate extension each extending from the airbag.

With reference to the Figures, wherein like numerals indicate like parts throughout the several views, a vehicle 10 is generally shown. The vehicle 10 includes front seats 12, 14 spaced from each other in a cross-vehicle direction Dc, a bulkhead 16 spaced from the front seats 12, 14 in a vehicle fore-and-aft direction Df, and an airbag 18 supported on the bulkhead 16. During a vehicle impact, the airbag 18 may be inflatable from an uninflated position, as shown in FIGS. 1, 2, and 5A, to an inflated position, as shown in FIGS. 3, 4, and 5B. During the vehicle impact, an occupant may be forced into the airbag 18 in the inflated position. During a frontal impact, the airbag 18 may provide coverage so as to absorb the energy for the knees and head of the occupant and reduce the likelihood of injury. During these types of impacts, the airbag 18 may slow or stop the head of the occupant and the knees of the occupant from impacting vehicle components. Some vehicle impacts, e.g., side impact, frontal offset impacts, far side oblique impact, near side oblique impact, roll-overs, etc., may cause occupants to move at an angle towards each other. During these types of impacts, the airbag 18 may slow or stop the head of the occupant from sliding across the airbag 18 to reduce the likelihood of the head of the occupant impacting another occupant.

Specifically, the airbag 18 includes a forward-facing panel 20 mounted to the bulkhead 16, i.e., the forward-facing panel 20 is mounted to the bulkhead 16 directly or through intermediate components, as shown in FIG. 2, and a rearward-facing panel 22 opposite the forward-facing panel 20. The airbag 18 includes a left extension 24 and a right extension 26 extending from the rearward-facing panel 22, and an intermediate extension 28 sandwiched between the left and right extensions 24, 26. The intermediate extension 28 extends from the rearward-facing panel 22 farther than the left and right extensions 24, 26. As the airbag 18 inflates from the uninflated position to the inflated position, the extensions, i.e., the left extension 24, the right extension 26, and the intermediate extension 28, may extend from the rearward-facing panel 22 towards the front seats 12, 14. In this situation, the left extension 24 may extend towards the one front seat 12 and the right extension 26 may extend towards the other front seat 14. The intermediate extension 28 may extend between the front seats 12, 14. The left extension 24 and the right extension 26 may slow or stop the head of the occupant from impacting vehicle components. When the head of the occupant impacts the intermediate extension 28, the intermediate extension 28 may catch the head of the occupant and retain the head of the occupant on one of the left extension 24 and the right extension 26. By extending between the front seats 12, 14, the intermediate extension 28 absorbs energy from the head of the occupant and may assist in preventing the occupants from impacting each other during the vehicle impact, which may reduce head injury criteria (HIC) and/or brain injury criteria (BrIC). Formulae for HIC and BrIC are standardized by the National Highway Traffic Safety Administration (NHTSA).

The vehicle 10 may, for example, be any suitable type of automobile. The vehicle 10 may, for example, be an autonomous vehicle. In this situation, the vehicle 10 may allow for the elimination of a steering wheel. For example, the vehicle 10 shown in FIGS. 1, 3, & 4 does not include the steering wheel. The vehicle 10 may have a computer (not shown) that may control the operations of the vehicle 10 in an autonomous mode, a semi-autonomous mode, and/or a non-autonomous mode. An autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle 10 propulsion, braking, and steering.

The vehicle 10 may include two sides 30, 32 spaced from each other in the cross-vehicle direction Dc. The sides 30, 32 of the vehicle 10 may be elongated in the vehicle fore-and-aft direction Df. Each side of the vehicle 10 may be similar or identical to each other.

With reference to FIG. 1, the vehicle 10 includes a passenger cabin 34 to house occupants, if any, of the vehicle 10. The passenger cabin 34 may extend across the vehicle 10, i.e., from one side 30 to the other side 32 of the vehicle 10. The passenger cabin 34 includes the front seats 12, 14 disposed at a front of the passenger cabin 34 and one or more rear seats (not numbered) spaced from the front seats 12, 14. The rear seats may be, for example, disposed behind the front seats 12, 14 in the passenger cabin 34. The passenger cabin 34 may also include third-row seats (not shown) at a rear (not numbered) of the passenger cabin 34, in which case the front seats 12, 14 may be second-row seats (not numbered) instead of or in addition to being front seats 12, 14. The front seats 12, 14 and the rear seats may be a same or different type of seat. The front seats 12, 14 and rear seats may be any suitable type of seats. The front seats 12, 14 may be, for example, a bucket seat and the rear seats may be, for example, a bench seat, as shown in FIG. 1.

With continued reference to FIG. 1, the vehicle 10 may include a body 36 having a roof 38, a floor 40 spaced from the roof 38, and front pillars 42, 44 extending downwardly from the roof 38, i.e., generally towards the floor 40. The roof 38 and the floor 40 may each extend across the passenger cabin 34, i.e., from one side 30 to the other side 32 of the vehicle 10.

With continued reference to FIG. 1, the front pillars 42, 44 may be spaced from each other in the cross-vehicle direction Dc. In other words, one front pillar 42 may be disposed on one side 30 of the vehicle 10, and the other front pillar 44 may be disposed on the other side 32 of the vehicle 10. The front pillars 42, 44 may be disposed at the front of the passenger cabin 34, e.g., adjacent the front seats 12, 14.

With continued reference to FIG. 1, the vehicle 10 may include a windshield 46 extending from one side 30 of the vehicle 10 to the other side 32 of the vehicle 10. In other words, the windshield 46 may extend from one front pillar 42 to the other front pillar 44. The windshield 46 may extend from the roof 38 along the front pillars 42, 44, i.e., towards the floor 40.

With reference to FIG. 2, the vehicle 10 may include a passenger restraint system 48 including the bulkhead 16 and an airbag assembly 50, which includes the airbag 18. The bulkhead 16 may support the airbag assembly 50, and specifically, may support the airbag 18 when the airbag 18 is in the inflated position.

With reference to FIG. 2, the airbag assembly 50 may include a base 52 mounted to the bulkhead 16 and supporting the airbag 18. Specifically, the base 52 may support the forward-facing panel 20 on the bulkhead 16. The base 52 may be flat. As another example, the base 52 may include a cavity (not shown) that may house the airbag 18 in the uninflated position and may support the airbag 18 on the bulkhead 16 in the inflated position. In other words, the base 52 may be a housing (not numbered). The base 52 may, for example, include clips, panels, etc. for attaching the forward-facing panel 20 and for attaching the airbag 18 to the bulkhead 16.

The base 52 may include two ends 58, 60 spaced from each other in the cross-vehicle direction Dc, as shown in FIG. 5A. The base 52 may be elongated from one side 30 of the vehicle 10 to the other side 32 of the vehicle 10, i.e., in the cross-vehicle direction Dc. For example, one end 58 of the base 52 may be adjacent one front pillar 42, i.e., one side 30 of the vehicle 10, and the other end 60 of the base 52 may be adjacent the other front pillar 44, i.e., the other side 32 of the vehicle 10.

The bulkhead 16 may be disposed in front of the front seats 12, 14, e.g., at the front of the passenger cabin 34, as shown in FIG. 1. The bulkhead 16 may support a plurality of vehicle components. For example, when the vehicle 10 is the autonomous vehicle, the bulkhead 16 may support upholstery, as set forth below, and/or entertainment features. Additionally, or alternatively, the bulkhead 16 may include an instrument panel (not shown). In these examples, when the airbag 18 is in the inflated position, the airbag 18 may extend from the roof 38 to the floor 40, as shown in FIG. 3. Additionally, the airbag 18 may be inflatable from the bulkhead 16 in the vehicle fore-and-aft direction Df, e.g., towards the front seats 12, 14.

With reference to FIG. 1, the bulkhead 16 may extend from one side 30 of the vehicle 10 to the other side 32 of the vehicle 10, i.e., across the passenger cabin 34 in the cross-vehicle direction Dc. For example, the bulkhead 16 may extend from one front pillar 42 to the other front pillar 44. In other words, the front pillars 42, 44 and the windshield 46 both may extend from the roof 38 to the bulkhead 16. Additionally, the bulkhead 16 may extend from the windshield 46 to the floor 40. The bulkhead 16 may, for example, be fixed to the floor 40 from one side 30 of the vehicle 10 to the other side 32 of the vehicle 10. The bulkhead 16 may be fixed to the floor 40 in any suitable manner, e.g., welding. The bulkhead 16 may, for example, separate the passenger cabin 34 from an engine compartment of the vehicle 10.

The vehicle 10 may include a fabric panel 54, i.e., upholstery, supported by the bulkhead 16. The fabric panel 54 may extend from one side 30 of the vehicle 10 to the other side 32 of the vehicle 10, e.g., across the bulkhead 16. The airbag assembly 50 may be disposed between the bulkhead 16 and the fabric panel 54 in the uninflated position, as shown in FIG. 2. The fabric panel 54 may have a tear seam 56 for allowing the airbag 18 to break through the fabric panel 54 when the airbag 18 is inflated from the uninflated position to the inflated position. The tear seam 56 may be adjacent the airbag 18 in the uninflated position, as shown in FIG. 2. The fabric panel 54 may be formed of any suitable type of material or materials, e.g., woven polymer.

The airbag 18, e.g., the forward-facing panel 20 and the rearward-facing panel 22, may be monolithic, e.g., a single piece of fabric. As another example, the airbag 18 may include a plurality of segments, i.e., two or more, that are separately formed and subsequently attached together. The segments may be attached to each other in any suitable fashion, e.g., stitching, ultrasonic welding, etc. For example, the forward-facing panel 20 and the rearward-facing panel 22 may be separate panels that are stitched together.

The airbag 18 may be formed of any suitable type of material or materials. The airbag 18 may be formed of any suitable airbag material, for example, a woven polymer. For example, the airbag 18 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIG. 4, in the inflated position, the forward-facing panel 20 may face the bulkhead 16, i.e., the forward-facing panel 20 may face away from the occupants of the passenger cabin 34. For example, the forward-facing panel 20 may be disposed between the bulkhead 16 and the rearward-facing panel 22. In other words, the forward-facing panel 20 may be adjacent vehicle components, e.g., the bulkhead 16, the windshield 46, the roof 38, the floor 40, etc.

With reference to FIG. 4, when in the inflated position, the rearward-facing panel 22 faces an intended occupant, e.g., the occupant of one front seat 12. The rearward-facing panel 22 is positioned to receive and be impacted by the occupant when the airbag assembly 50 is inflated during an impact that urges the occupant toward the airbag assembly 50. The rearward-facing panel 22 may, for example, be disposed between the forward-facing panel 20 and the front seats 12, 14, i.e., the occupants.

With reference to FIG. 3, the rearward-facing panel 22 may include a first portion 62 extending upwardly relative to the base 52 to a first distal end 64 and a second portion 66 extending downwardly relative to the base 52 to a second distal end 68. When the airbag 18 is in the inflated position, the bulkhead 16 may provide a counteracting force against the second portion 66 of the rearward-facing panel 22 when the rearward-facing panel 22 is impacted by the knees of the occupant such that the second portion 66 is squeezed between the knees of the occupant and the bulkhead 16. Additionally, in the inflated position, the windshield 46 may provide a counteracting force against the first portion 62 of the rearward-facing panel 22 when the rearward-facing, e.g., one of the left extension 24 and the right extension 26, is impacted by the head of the occupant such that the first portion 62 is squeezed between the head of the occupant and the windshield 46.

With continued reference to FIG. 3, the rearward-facing panel 22 may include a first side 70 and a second side 72 spaced from each other in the cross-vehicle direction Dc. The first side 70, for example, may be adjacent the one front pillar 42, and the second side 72, for example, may be adjacent the other front pillar 44. In other words, the first side 70 may be adjacent one side 30 of the vehicle 10 and the second side 72 may be adjacent the other side 32 of the vehicle 10. The first side 70 and the second side 72 may extend from the first distal end 64 to the second distal end 68. In other words, the rearward-facing panel 22, i.e., first portion 62 and the second portion 66, may extend from one side 30 of the vehicle 10 to the other side 32 of the vehicle 10 in the inflated position.

With continued reference to FIG. 3, in the inflated position, the first portion 62 may extend upwardly relative to the base 52. For example, the first portion 62 may extend in a first direction D1, e.g., generally upwardly, relative to the base 52. Additionally, the second portion 66 may extend in a second direction D2 transverse to the first direction, e.g., generally downwardly, relative to the base 52. The first direction may, for example, extend along the windshield 46, e.g., towards the roof 38, away from the base 52. The second direction may, for example, extend along the bulkhead 16, e.g., towards the floor 40, away from the base 52.

The first distal end 64 may be spaced from the base 52, as shown in FIG. 5B. In the inflated position, the first portion 62 extends in the first direction away from the base 52 to the first distal end 64. The first distal end 64 may be adjacent the roof 38 in the inflated position, as shown in FIG. 4, i.e., the first portion 62 may extend from the base 52 across the windshield 46 and the roof 38. The first distal end 64 may be, for example, disposed between the roof 38 and the heads of the occupants of the front seats 12, 14. The first portion 62 may extend at least partially over the seat bottoms of the front seats 12, 14.

Figure 6:
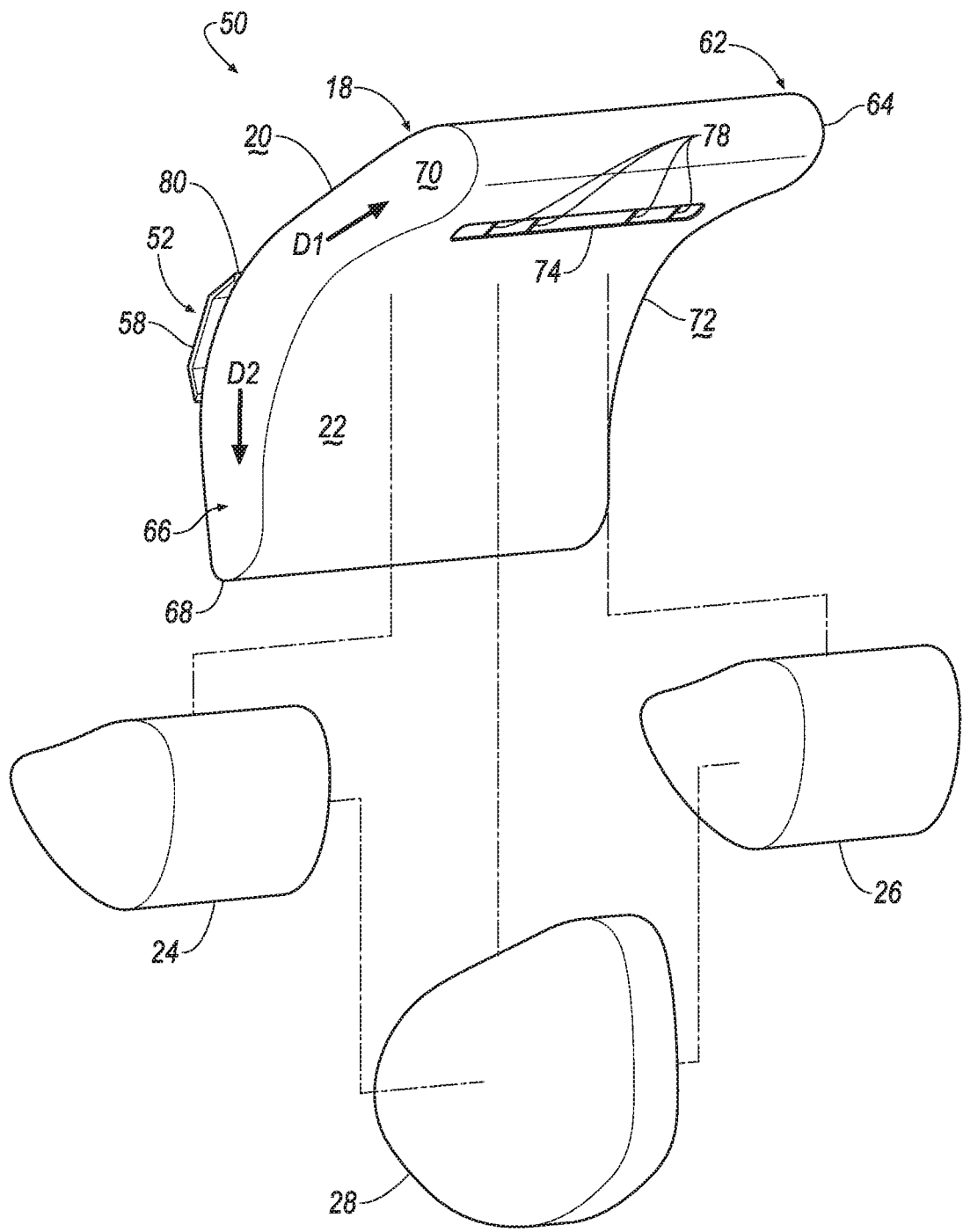
FIG. 6 is an exploded view of the airbag assembly in the inflated position.

With reference to FIG. 6, the first portion 62 may include an opening 74 extending through the rearward-facing panel 22 into each of the left extension 24, the right extension 26, and the intermediate extension 28. For example, the opening 74 may extend across the first portion 62 of the rearward-facing panel 22 adjacent each extension. Alternatively, one opening 74 may be disposed adjacent each extension, i.e., the left extension 24, the right extension 26, and the intermediate extension 28. The opening 74 may be disposed at any suitable location on the first portion 62. In other words, the opening 74 may be disposed at any suitable location between the base 52 and the first distal end 64. The opening 74 may have any suitable shape, e.g., elliptical, circular, etc. As another example, the first portion 62 may include a vent (not shown) disposed adjacent each extension. In this situation, the vent may control the gas flow into each extension. The vent may be any suitable type of vent. For example, the vent may be a one-way vent, i.e., an adaptive vent, allowing gas flow from the first portion 62 into each extension, i.e., the left extension 24, the right extension 26, and the intermediate extension 28, and preventing gas flow from each extension into the first portion 62. Alternatively, the vent may allow for two-way gas flow.

The left extension 24 may extend along the first portion 62 of the rearward-facing panel 22 from the first side 70 towards the second side 72, as shown in FIG. 5B. The left extension 24 may extend in the cross-vehicle direction Dc any suitable amount. For example, the left extension 24 may extend across one front seat 12. The left extension 24 may, for example, face the occupant of the one front seat 12 in the inflated position, as shown in FIG. 3. The left extension 24 is positioned to receive and be impacted by the occupant of the one front seat 12 when the airbag 18 is inflated during the vehicle impact. During inflation, the left extension 24 may extend transverse to the first portion 62, e.g., downwardly from the first portion 62. In other words, the left extension 24 may extend from the first portion 62 towards the one front seat 12 in the inflated position.

The right extension 26 may extend along the first portion 62 of the rearward-facing panel 22 from the second side 72 towards the first side 70, as shown in FIG. 6. In other words, the left extension 24 and the right extension 26 may be spaced from each other in the cross-vehicle direction Dc. The right extension 26 may extend in the cross-vehicle direction Dc any suitable amount. For example, the right extension 26 may extend across the other front seat 14. The right extension 26 may, for example, face the occupant of the other front seat 14 in the inflated position, as shown in FIG. 3. The right extension 26 is positioned to receive and be impacted by the occupant of the other front seat 14 when the airbag 18 is inflated during the vehicle impact. During inflation, the right extension 26 may extend transverse to the first portion 62, e.g., downwardly from the first portion 62. In other words, the right extension 26 may extend from the first portion 62 towards the other front seat 14 in the inflated position.

The intermediate extension 28 may extend in the cross-vehicle direction Dc from the left extension 24 to the right extension 26, as shown in FIG. 5B. The intermediate extension 28, for example, may extend between the front seats 12, 14 in the inflated position. During inflation, the intermediate extension 28 may extend transverse to the first portion 62, e.g., downwardly from the first portion 62. The intermediate extension 28 may extend farther from the first portion 62 that the left and right extensions 24, 26, as set forth above. For example, in the inflated position the left and right extensions 24, 26 may be spaced farther from the seatbacks of the front seats 12, 14 than the intermediate extension 28, as shown in FIG. 4. As another example, the left and right extensions 24, 26 may be spaced farther from the seat bottoms of the front seats 12, 14 than the intermediate extension 28, as shown in FIG. 4.

The intermediate extension 28 may be attached to both the left extension 24 and the right extension 26. The intermediate extension 28 may be attached to the left and right extensions 24, 26 in a same or different manner. The intermediate extension 28 may be attached to the left and right extensions 24, 26 in any suitable manner, e.g., stitching, ultrasonic welding, etc.

Each extension, e.g., the left extension 24, the right extension 26 and the intermediate extension 28, may extend across the opening 74, as shown in FIG. 5B. As another example, when the first portion 62 includes one opening 74 adjacent each extension, each extension may encompass one of the openings 74 on the rearward-facing panel 22. In other words, each extension may cover one of the openings 74 such that each opening 74 is covered by one extension.

Each extension, e.g., the left extension 24, the right extension 26 and the intermediate extension 28, may be attached to the first portion 62 of the rearward-facing panel 22. Each extension may, for example, be attached to the first portion 62 on opposite sides of the opening 74. In other words, each extension may be attached to the first portion 62 along the first portion 62 from the opening 74 towards the first distal end 64 and along the first portion 62 from the opening 74 towards the second portion 66, i.e., the base 52. Each extension may be attached to the first portion 62 of the rearward-facing panel 22 in any suitable manner, e.g., stitching, ultrasonic welding, adhesive, etc.

The second distal end 68 may be spaced from the base 52, as shown in FIG. 5B. In the inflated position, the second portion 66 may extend in the second direction away from the base 52 to the second distal end 68. The second distal end 68 may be adjacent the floor 40, as shown in FIG. 4. The second distal end 68 is spaced from the first distal end 64 in the inflated position. In other words, the rearward-facing panel 22 may extend from the roof 38 to the floor 40 in the inflated position. The second distal end 68 may be, for example, disposed adjacent the knees of the occupants in the inflated position, i.e., adjacent the seat bottoms of the front seats 12, 14. In other words, the second portion 66 may extend along the bulkhead 16 to the second distal end 68.

The first portion 62 and the second portion 66 may extend in opposite directions from the base 52 in the uninflated position, as shown in FIGS. 2 and 5A. The first portion 62 may extend, for example, away from the base 52 towards the roof 38 of the vehicle 10, i.e., in the first direction. The second portion 66 may extend, for example, away from the base 52 towards the floor 40 of the vehicle 10, i.e., in the second direction.

The first portion 62 and the second portion 66 may be rolled in opposite directions relative to the base 52 in the uninflated position, as shown in FIGS. 2 and 5A. The first portion 62 may be rolled, i.e., turned over on itself, in a clockwise CW direction towards the base 52. The second portion 66 may be rolled, i.e., turned over on itself, in a counterclockwise CCW direction towards the base 52.

The airbag 18, e.g., the rearward facing-panel and the forward-facing panel 20, may define an inflation chamber 76, as shown in FIG. 2. During inflation, the inflation chamber 76 may be inflated from the uninflated position to the inflated position. The rearward-facing panel 22 is spaced from the base 52 in the inflated position. For example, the rearward-facing panel 22 is adjacent the occupants in the inflated position. During inflation, the forward-facing panel 20 and the rearward-facing panel 22 may be inflatable upwardly and downwardly relative to the base 52. The rearward-facing panel 22 may, for example, extend upwardly to the first distal end 64 and downwardly to the second distal end 68. The forward-facing panel 20 may, for example, extend from the base 52 to the rearward-facing panel 22. For example, the forward-facing panel 20 may extend upwardly from the base 52 to the first distal end 64 of the rearward-facing panel 22 and downwardly from the base 52 to the second distal end 68 of the rearward-facing panel 22. In other words, the forward-facing panel 20 and the rearward-facing panel 22 may each extend in both the first direction and the second direction in the inflated position.

The inflation chamber 76 may be in fluid communication with each of the left extension 24, the right extension 26, and the intermediate extension 28. In other words, the inflation chamber 76 may extend into each of the left extension 24, the right extension 26, and the intermediate extension 28 in the inflated position. In this situation, the opening 74 may allow gas flow into each extension.

The airbag 18 may include a plurality of internal tethers 78 disposed in the inflation chamber 76. The internal tethers 78 may extend across the inflation chamber 76 from the first portion 62 of the rearward-facing panel 22 to each extension. In other words, the internal tethers 78 may extend across the extensions, as shown in FIG. 5B. As another example, the internal tethers 78 may extend from the base 52 to the rearward-facing portion, e.g., the first portion 62 and the second portion 66. Alternatively, the internal tethers 78 may extend across the inflation chamber 76 in the first portion 62 and/or the second portion 66, i.e., from the forward-facing panel 20 to the rearward-facing panel 22. As yet another example, the internal tethers 78 may extend across the opening 74 in the first direction, i.e., towards the first distal end 64, as shown in FIG. 6. The internal tethers 78 may be attached to the airbag 18 in any suitable manner, e.g., stitching, ultrasonic welding, etc. The internal tethers 78 may be attached to the base 52 in a same or different manner as the airbag 18, as set forth above.

The passenger restraint system 48 may include a deflector 80 adjacent the airbag 18, e.g., the forward-facing panel 20, to deflect the airbag 18 to the inflated position. The deflector 80 may, for example, extend from the base 52, as shown in FIG. 2. In other words, the deflector 80 and the base 52 may be unitary, i.e., a single continuous unit. As another example, the deflector 80 may be separate from the base 52. In this situation, the deflector 80 may be attached to one of the base 52 and the bulkhead 16. The deflector 80 may be attached to one of the base 52 and the bulkhead 16 in any suitable manner, e.g., welding, adhesive, fasteners, etc. The deflector 80 may extend in any suitable direction. In other words, the deflector 80 may have a deflecting surface (not numbered) that extends in any suitable direction. The deflector 80 may be formed of any suitable type of material such as metal, plastic, etc.

The passenger restraint system 48 may include any suitable number of deflectors 80. For example, the passenger restraint system 48 may include one deflector 80 adjacent the first portion 62 of the airbag 18. In this situation, the deflector 80 extends in the first direction, i.e., the deflector 80 may deflect the airbag 18 in the first direction, i.e., generally upward. In other words, the deflecting surface may be parallel to the first direction, or the direction of the extension of the deflecting surface may have a component, i.e., a vector, in the first direction. As another example, the passenger restraint system 48 may include one deflector 80 adjacent the second portion 66 of the airbag 18. In this situation, the deflector 80 extends in the second direction, i.e., the deflector 80 may deflect the airbag 18 in the second direction, i.e., generally downward. In other words, the deflecting surface may be parallel to the second direction, or the direction of the extension of the deflecting surface may have a component, i.e., a vector, in the second direction. As yet another example, the passenger restraint system 48 may include one deflector 80 adjacent each of the first portion 62 and the second portion 66, i.e., two deflectors 80 to deflect the airbag 18 in both the first direction and the second direction, as shown in FIG. 2.

The airbag assembly 50 may include an inflator 82 in fluid communication with the airbag 18 that inflates the airbag 18 from the uninflated position to the inflated position. The inflator 82 expands the airbag 18 with an inflation medium, such as a gas, to move the airbag 18 from the uninflated position to the inflated position. Specifically, the inflator 82 may be in communication with the inflation chamber 76 to supply the inflation medium to the inflation chamber 76. The inflator 82 may be disposed in the base 52, as shown in FIG. 2, or may be disposed in any other suitable location. Alternatively, the inflator 82 may be supported by the bulkhead 16 or any other suitable vehicle component.

The inflator 82 may be, for example, a pyrotechnic inflator that uses a chemical reaction to drive the inflation medium into the airbag 18. Alternatively, the inflator 82 may be, for example, a cold-gas inflator that, when activated, ignites a pyrotechnic charge that creates an opening 74 for releasing the pressurized inflation medium to the airbag 18 via a fill tube (not shown). Alternatively, the inflator 82 may be of any suitable type, for example, a hybrid inflator.

Figure 7:
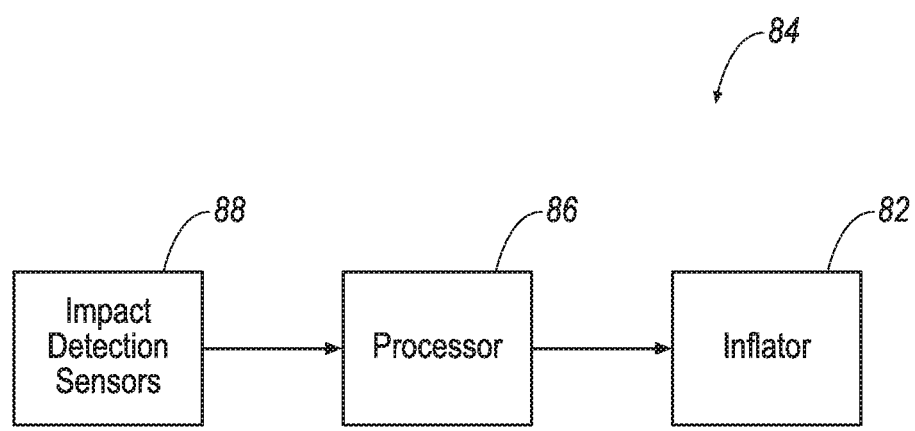
FIG. 7 is a flowchart of an inflation system of the vehicle.

With reference to FIG. 7, the vehicle 10 may include an inflation system 84. The inflation system 84 includes a processor 86 programmed to initiate an inflation of the airbag 18 in response to the vehicle impact. The processor 86 may be embedded in a microcontroller. The microcontroller may include memory, etc. The memory of the microcontroller may store instructions executable by the processor 86 and the processor 86 may read the instructions from the memory and execute the instructions.

The vehicle 10 may include impact detection sensors 88 programmed to detect the vehicle impact to the vehicle 10. The impact detection sensors 88 may be disposed on the bulkhead 16 or elsewhere in the vehicle 10. The impact detection sensors 88 may be of various types, e.g., pressure sensor, acceleration sensor, vision sensor, etc. When the vehicle impact occurs, the processor 86 may receive one or more signals from the impact detection sensors 88 indicating the vehicle impact. In response to receiving the signals from the impact detection sensors 88, the processor 86 may initiate the inflation of the airbag 18. Alternatively, the processor 86 may initiate the inflation of the airbag 18 selectively based on information from the impact detection sensors 88 identifying the physical characteristics of the vehicle impact, e.g., which side of the vehicle 10 impacted, amount of pressure applied to the vehicle 10, etc. and also seat occupancy information, e.g., by using the occupancy sensors disposed inside the seats sensing the occupancy status of the seats.

In order to receive the signals from the impact detection sensors 88 and to initiate the inflation of the airbag 18, the processor 86 communicates with the impact detection sensors 88 and the inflator 82, e.g., through a direct electrical wiring, through which an analog or a digital signal is transmitted, or through a communication network like CAN (Control Area Network), Ethernet, LIN (Local Interconnect Network) or any other way.

In operation, the airbag 18 is in the uninflated position, as shown in FIGS. 1, 2 and 5A, under normal operating conditions of the vehicle 10. When the impact detection sensors 88 sense an impact of the vehicle 10, the processor 86 triggers the inflator 82 to inflate the airbag 18 with the inflation medium from the uninflated position to the inflated position. When the inflator 82 inflates the airbag 18 to the inflated position, the inflation medium flows to the inflation chamber 76 increasing the pressure in the inflation chamber 76. As the pressure is increased in the inflation chamber 76, the rearward-facing panel 22 and the forward-facing panel 20 extend away from the base 52 in the first direction and the second direction. In the inflated position, the forward-facing panel 20 may extend along the windshield 46 and the roof 38 in the first direction and may extend along the bulkhead 16 in the second direction. The left extension 24 and the right extension 26 may extend from the first portion of the rearward-facing panel 22 towards the one front seat 12 and the other front seat 14, respectively. The intermediate extension 28 may extend between the front seats 12, 14 in the inflated position. As the occupant moves within the vehicle 10 due to the momentum of the vehicle impact, the occupant may move towards the first portion, e.g., one of the left extension 24 and the right extension 26, and the second portion 66 of the rearward-facing panel 22. In other words, the head of the occupant may move towards the first portion and the knees of the occupant may move towards the second portion 66. When the head of the occupant impacts one of the left extension 24 and the right extension 26, the head of the occupant may slide or rotate towards another occupant. In this situation, the head of the occupant may impact the intermediate extension 28. The intermediate extension 28 may catch the head of the occupant to reduce sliding and/or rotating motion. When the knees of the occupant impact the second portion 66 of the rearward-facing panel 22, the second portion 66 may absorb the energy from the knees of the occupant, which may assist in reducing knee impact injuries.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a bulkhead;
an airbag inflatable to an inflated position;
the airbag including a forward-facing panel mounted to the bulkhead and a rearward-facing panel opposite the forward-facing panel;
the airbag in the inflated position having a left extension and a right extension extending from the rearward-facing panel, and an intermediate extension between and abutting the left and right extensions and extending from the rearward-facing panel farther than the left and right extensions.

2. The vehicle of claim 1, wherein the forward-facing panel faces the bulkhead.

3. The vehicle of claim 1, further comprising a base mounted to the bulkhead and supporting the airbag, the forward-facing panel and the rearward-facing panel being inflatable upwardly and downwardly relative to the base.

4. The vehicle of claim 3, wherein the rearward-facing panel includes a first portion extending upwardly relative to the base to a first distal end spaced from the base.

5. The vehicle of claim 4, wherein the left extension, the right extension, and the intermediate extension each extend from the first portion.

6. The vehicle of claim 4, wherein the first portion includes an opening extending into each of the left extension, the right extension, and the intermediate extension, and wherein a plurality of tethers extend across the opening.

7. The vehicle of claim 4, wherein the rearward-facing panel includes a second portion extending downwardly relative to the base to a second distal end.

8. The vehicle of claim 7, wherein the first portion and the second portion are rolled in opposite directions relative to the base in an uninflated position.

9. The vehicle of claim 1, further comprising a deflector extending from a base adjacent to the forward-facing panel, the deflector extending transverse to the bulkhead.

10. The vehicle of claim 1, further comprising a roof and a floor spaced from the roof, the airbag in the inflated position extending from the roof to the floor.

11. The vehicle of claim 10, further comprising a base mounted to the bulkhead and supporting the airbag, and the rearward-facing panel includes a first portion extending upwardly relative to the base along the roof to a first distal end adjacent the roof, the left extension, the right extension, and the intermediate extension each extending downwardly from the first portion towards the floor.

12. The vehicle of claim 1, further comprising front pillars spaced from each other in a cross-vehicle direction, the airbag extending from the one front pillar to the other front pillar.

13. The vehicle of claim 1, further comprising front seats spaced from each other, the intermediate extension in the inflated position disposed between the one front seat and the other front seat.

14. The vehicle of claim 1, wherein the intermediate extension is attached to both the left extension and the right extension.

15. An airbag assembly comprising:
a base;
an airbag inflatable to an inflated position;
the airbag including a forward-facing panel mounted to the base and a rearward-facing panel opposite the forward-facing panel;
the airbag in the inflated position having a left extension and a right extension extending from the rearward-facing panel, and an intermediate extension between and abutting the left and right extensions and extending from the rearward-facing panel farther than the left and right extensions.

16. The airbag assembly of claim 15, wherein the forward-facing panel and the rearward-facing panel are inflatable upwardly and downwardly relative to the base.

17. The airbag assembly of claim 15, wherein the rearward-facing panel includes a first portion extending upwardly relative to the base to a first distal end.

18. The airbag assembly of claim 17, wherein the left extension, the right extension, and the intermediate extension each extend downwardly from the first portion.

19. The airbag assembly of claim 17, wherein the rearward-facing panel includes a second portion extending downwardly relative to the base to a second distal end, the second distal end spaced from the first distal end in the inflated position.

20. The airbag assembly of claim 19, wherein the first portion and the second portion are rolled in opposite directions relative to the base in an uninflated position.

* * * * *